Dec. 16, 1924.                                                                 1,519,714
W. W. ALLEN
LAWN MOWER ATTACHMENT
Filed Jan. 8, 1924
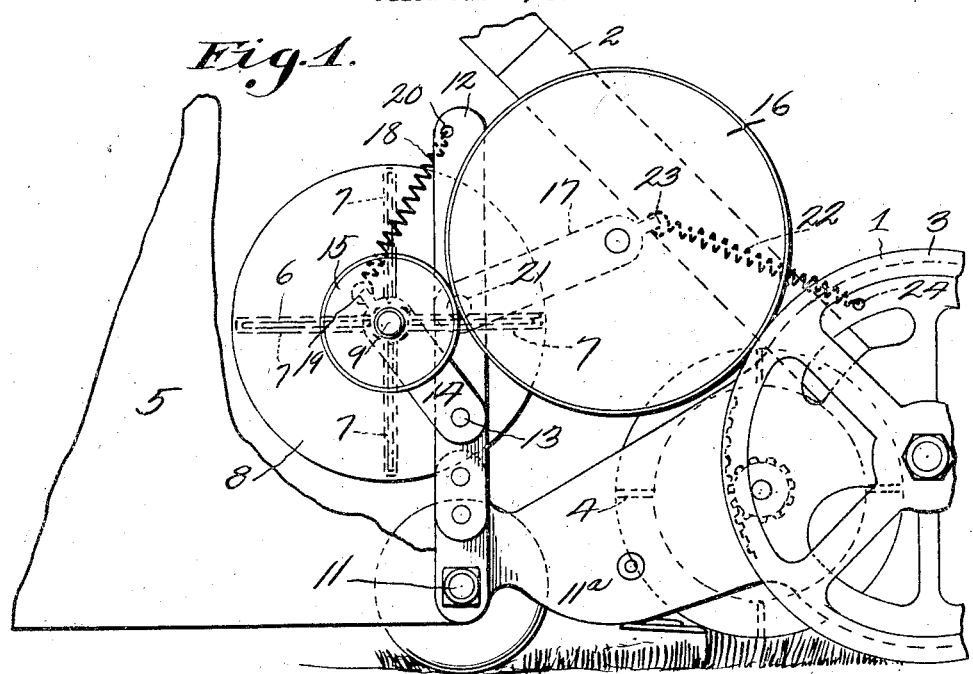
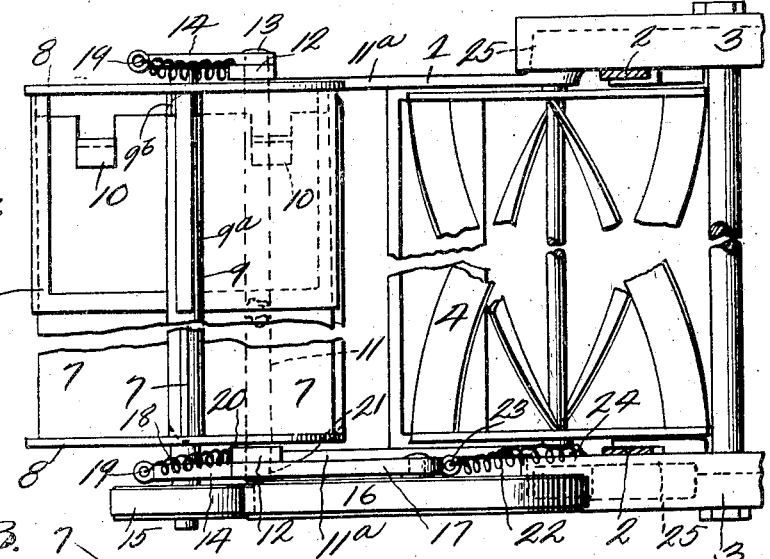
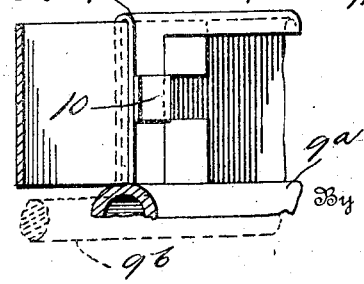
Inventor
W. W. Allen
By D. Swift
Attorney Patented Dec. 16, 1924.

1,519,714

UNITED STATES PATENT OFFICE.

WILLES W. ALLEN, OF BAKERSFIELD, CALIFORNIA.

LAWN-MOWER ATTACHMENT.

Application filed January 8, 1924. Serial No. 685,016.

*To all whom it may concern:*

Be it known that I, WILLES W. ALLEN, a citizen of the United States, residing at Bakersfield, in the county of Kern, State of California, have invented a new and useful Lawn-Mower Attachment; and I do hereby declare the following to be a full, clear, and exact description of the invention, such as will enable others skilled in the art to which it appertains to make and use the same.

The invention relates to lawn mower attachments and has for its object to provide in combination with a lawn mower, a rotatable fan, which fan is driven by one of the ground engaging wheels of the lawn mower for directing a current of air rearwardly for blowing the severed grass into the lawn mower basket.

A further object is to support the rotatable fan in pivoted arms pivoted to vertical uprights, to which a second pivoted arm is connected and provided with a frictional wheel which engages a smaller friction wheel fixed to the fan shaft. Both friction wheels and one of the ground engaging wheels of the lawn mower are held in frictional engagement with one another by means of springs.

A further object is to provide means whereby the fan may be shortened or lengthened, thereby allowing the device to be applied to lawn mowers of different widths.

A further object is to provide a fan attachment for lawn mowers, which attachment may be easily and quickly applied to lawn mowers of different widths and the fan positioned where the severed grass will be blown rearwardly into a basket carried by the lawn mower.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of a conventional form of law mower showing the fan device applied thereto.

Figure 2 is a top plan view of the lawn mower attachment.

Figure 3 is a detail perspective of one of the fan blades.

Referring to the drawing, the numeral 1 designates a conventional form of lawn mower, 2 a pivoted handle thereof, and 3 the ground engaging wheels. It has been found in conventional forms of lawn mowers that when the cutter blades 4 rotate, the severed grass is thrown in various directions, particularly upwardly incident to the centrifugal force after the severing operation, which takes place adjacent the ground. Consequently the severed grass can not be easily collected in the basket 5 carried by the lawn mower and located rearwardly thereof. To obviate this difficulty the rotatable fan 6 is provided, which fan has its blades 7 formed from telescopically engaging members, thereby allowing the fan to be shortened or lengthened when applying the device to lawn mowers of different widths. The blades 7 are carried by end discs 8, which discs are secured to the fan shaft 9, therefore it will be seen that when said shaft is rotated the fan 6 will also rotate for directing a draft of air rearwardly and consequently blowing the severed grass into the basket 5. The shaft 9 is formed from telescopically engaged sections $9^a$ and $9^b$, consequently the fan can be shortened or lengthened as desired. One of the sections of the fan blades 7 are provided with lugs 10 for limiting the outward movement of the fan blade sections, and consequently prevent the sections from coming apart.

Secured to the lawn mower and preferably to the roller shaft 11 and the rearwardly extending arms $11^a$ of the mower are upwardly extending arms 12, which arms have pivotally connected thereto at 13 upwardly and rearwardly extending arms 14, in bearings of the free ends of which the ends of the shaft 9 of the fan are rotatably mounted, and one end of said shaft is provided with a friction wheel 15, which friction wheel is forced into engagement with the drive wheel 16, which is supported on a pivoted arm 17. Coiled springs 18 are connected at 19 to each of the pivoted arms 14 and anchored at 20 to the upper end of the rigid arms 12, consequently the friction wheel 15 is maintained in close frictional engagement with the friction drive wheel 16 at all times. The arm 17 on which is rotatably mounted the drive wheel 16, is pivotally connected at 21 to one of the arms 12 and is held in close engagement with the ground engaging wheel 3 of the lawn mower by means of a coiled spring 22, which coiled spring is connected at 23 to the free end of the pivoted arm 17 and at 24 to the inner side of the stationary gear casing 25 of the lawn mower. Therefore it will be seen that the spring 22 will hold the friction drive wheel 16 in frictional engagement with the ground engaging wheel at all times, and consequently it will be seen that when the lawn mower is moved forwardly the fan will be rotated through the drive wheel 16 and friction wheel 15 for driving a current of air rearwardly and blowing the severed grass into the basket 5, thereby insuring the collection of all of the severed grass, and obviating the necessity of raking a lawn after a mowing operation.

From the above it will be seen that a lawn mower fan is provided which is simple in construction, driven by one of the ground engaging wheels of the lawn mower, and one which may be extended or shortened for applying the device to lawn mowers of different widths.

The invention having been set forth what is claimed as new and useful is:—

1. The combination with a lawn mower having ground engaging wheels and a collecting basket rearwardly of said lawn mower, of a fan carried by said lawn mower and adapted to direct a blast of air rearwardly into the basket, vertically disposed brackets mounted on the lawn mower, rearwardly and upwardly extending arms pivoted to said bracket, bearings on said arms, a shaft carrying said fan rotatably mounted in the bearings of said arms, a friction wheel carried by said shaft, a forwardly and upwardly extending arm pivotally carried by one of the brackets at one side of the mower, a second friction wheel pivotally mounted on said forwardly and upwardly extending arm, and spring means for maintaining the friction wheels in close engagement with each other and the second friction wheel in close engagement with one of the ground engaging wheels.

2. The combination with a lawn mower having ground engaging wheels and a grass collecting basket rearwardly of the wheels, of a fan disposed between the basket and the wheels, a shaft supporting said fan, means for rotating said shaft and fan, said means comprising vertically disposed arms rearwardly of the wheels, rearwardly and upwardly extending arms pivoted to the vertical arms and supporting the shaft and fan, a coiled spring connecting the rearwardly and upwardly extending arms and the first named arms and normally forcing the fan forwardly, a forwardly and upwardly extending arm pivoted to one of the first named arms, spring means carried by the upwardly and forwardly extending arm for normally forcing said arm downwardly, a friction disc engaging one of the ground engaging wheels and mounted on the forwardly and upwardly extending arm and a friction disc carried by the fan shaft and engaging the rear side of the first mentioned friction disc.

In testimony whereof I have signed my name to this specification in the presence of two subscribing witnesses.

WILLES W. ALLEN.

Witnesses:
CHARLES L. TAYLOR,
JAS. D. SHIELDS.